United States Patent [19]

Yanagisawa

[11] Patent Number: 4,566,667
[45] Date of Patent: Jan. 28, 1986

[54] SEAT SUSPENSION

[75] Inventor: Hiroshi Yanagisawa, Akishima, Japan

[73] Assignee: Tachikawa Spring Co., Ltd., Tokyo, Japan

[21] Appl. No.: 529,682

[22] Filed: Sep. 6, 1983

[51] Int. Cl.⁴ .............................................. F16M 13/00
[52] U.S. Cl. ..................................... 248/561; 248/421; 248/563; 74/534; 74/97
[58] Field of Search ............... 248/561, 563, 500, 507, 248/509, 421; 74/97, 534; 16/291, 292, 293, 294

[56] References Cited

U.S. PATENT DOCUMENTS

| | | | |
|---|---|---|---|
| 3,065,828 | 11/1962 | Caldemeyer | 248/561 X |
| 3,481,437 | 12/1969 | Araikawa | 74/97 X |
| 3,797,798 | 3/1974 | Magruder et al. | 248/561 |
| 4,387,876 | 6/1983 | Nathan | 248/421 X |
| 4,487,390 | 12/1984 | Miyashita | 248/421 X |

Primary Examiner—J. Franklin Foss
Assistant Examiner—David M. Purol
Attorney, Agent, or Firm—Cushman, Darby & Cushman

[57] ABSTRACT

A seat suspension is disclosed in which a movable frame to be mounted onto a seat cushion for an automobile so as to be resiliently movable relative to a base frame mounted onto the floor surface of the automobile. The movable and base frames are connected with each other such that the movable frame can be moved elastically and vertically by means of two links mounted crosswise and pivotally and a spring constantly biasing these two links. Between the movable and base frames, there is provided a lock mechanism which is arranged to lock the movable frame at a desired height level. The lock mechanism includes a lock piece which is provided in either the base frame or the movable frame and has a plurality of engagement recesses in a vertical direction, and a lock pin which is provided in the other frame and is adapted to be engaged within the engagement recesses of the lock piece.

3 Claims, 4 Drawing Figures

SEAT SUSPENSION

TECHNICAL FIELD OF THE INVENTION

The present invention relates to a seat suspension for a vehicle seat, and in particular to a seat suspension which can be locked in a desired height level to stop its suspension function.

BACKGROUND

Conventionally, seat suspensions are well known which are arranged to be maintained in a predetermined height level even when drivers of varying weights occupy a driving seat such as a truck cab and also which are provided between a seat and the floor surface of a car body so as to improve the comfortableness of the occupants of the seat. Such seat suspensions are designed to have an elastic property by means of a spring or pneumatic means and, accordingly, when driving a car in bad road conditions, such suspensions roll as the car body sways from side to side which impairs the comfort of the occupant. The elastic property may or may not be necessary depending on actual running road conditions or an occupant's preference. Also, the distance between the seat suspension and the steering wheel when the seat is occupied varies from that when unoccupied because of the elasticity of the seat suspension. In particular, in the unoccupied condition, the seat cushion is lifted up to narrow the distance. As a result, it is difficult for a person to climb in or out of the car smoothly.

In view of the above-mentioned drawbacks of the prior art seat suspensions, the present invention aims at providing a new seat suspension in which a lock mechanism is provided to lock the seat suspension in a desired height level and the locked height level can be adjusted in a plurality of steps.

BRIEF SUMMARY OF THE INVENTION

In brief, the above and other objects, features and advantages of the present invention can be attained in the following manner:

A lock mechanism is provided between a movable frame to be mounted onto a seat cushion and a base frame to be fixed onto a vehicle floor, so that the movable frame can be locked in a pretermined height.

This lock mechanism L consists of lock pieces with respective lock levers which are provided in either the movable frame or in base frame and are respectively formed with a plurality of engagement recesses extending in a vertical direction and lock pins which are provided in the other frame and are adapted to be engaged within the recesses of the lock pieces. When the lock pieces are engaged with the lock pins, the movable frame is locked in such a height as to suit an occupant'-preference.

Accordingly, since the movable frame and thus the seat cushion can be adjustably locked in height, the seat suspension can be used as a seat lifter which adjusts the height of the seat cushion.

If the lock mechanism L is released from its locked position, then the movable frame is free to rise and fall, so that the suspension function resumes again.

According to the present invention, the resilient means is not limited to a spring but a pneumatic or hydraulic means may also be used.

BRIEF DESCRIPTION OF THE DRAWINGS

The above and other objects, features and advantages of the invention will be more fully apparent to those of ordinary skill in the art to which this invention pertains from the following detailed description wehn considered in connection with the accompanying drawings, in which like reference characters designate like or corresponding parts throughout the several views and wherein.

DETAILED DESCRIPTION OF THE EMBODIMENT OF THE INVENTION

Figure 1:
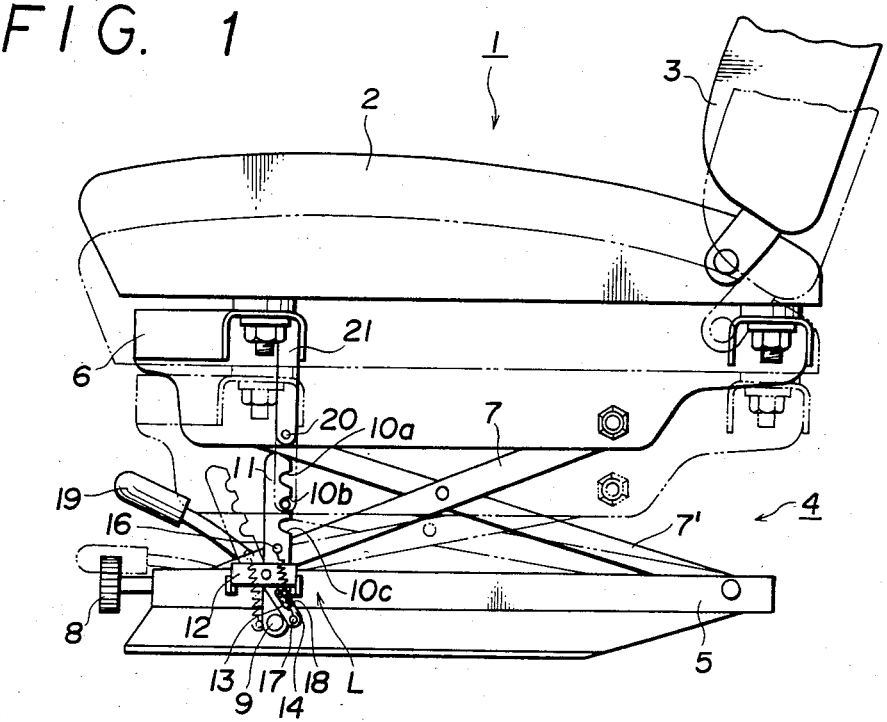
FIG. 1 is a partly-omitted side elevation of a vehicle seat provided with a seat suspension according to the invention.
Figure 2:
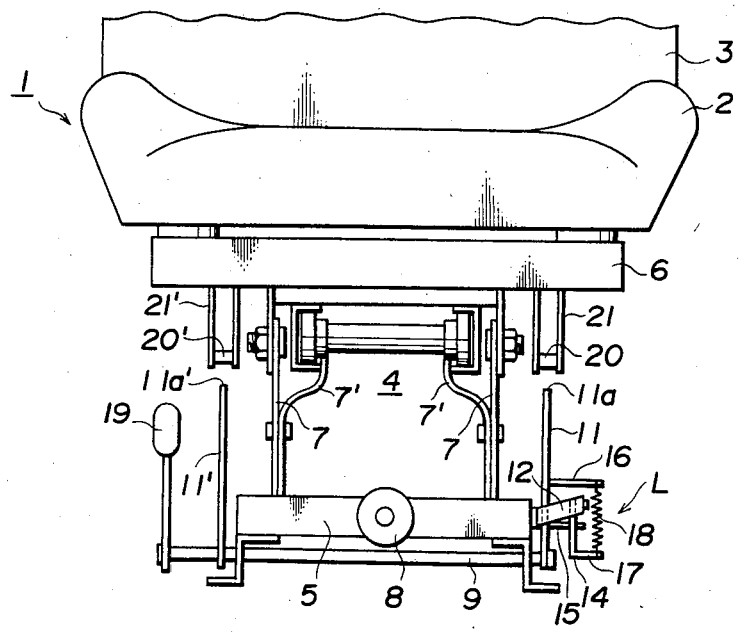
FIG. 2 is a front elevation thereof.

In the drawings, (1) designates an entire seat, (2) represents a seat cushion and (3) denotes a seat back, the seat cushion (2) being secured to a seat suspension (4).

The seat suspension (4) connects a base frame (5) with a movable frame (6) in a pantographic way by means of links (7), (7') which are mounted pivotally and crosswise at both sides of the base and movable frames. Between these links (7) and (7'), or, between the pivotal end of link (7) or (7') and the sliding end of link (7') or (7) there is extended a spring (not shown) to constantly bias the links (7) and (7') in their standing-up direction so that the movable frame (6) is lifted up resiliently. The spring is arranged such that its elastic force can be controlled by a control handle (8) and thus the displacement height of the movable frame (6) can be adjusted accordingly.

A lock mechanism designated by L is provided in the seat suspension (4). In particular, transversely of the front portion of the base frame (5) there is provided a lock shaft (9) such that it extends therethrough and is journalled. At both ends of this lock shaft, vertically of the rear edge side there are provided a plurality of engagement recesses (10) ((10a) (10b) (10c)) at desired intervals, to which two lock pieces (11) (11') having rearwardly inclined upper edges (11a) (11a') respectively are fixed. On one side surface of the base frame (5) there is fixed a bracket (12) such that it surrounds one lock piece (11) and to this bracket (12) is rotatably secured a hooker link (14) having a longitudinally-extending, elongated slot (13).

Within the elongated slot (13) in the hooker link (14) is inserted and engaged a guide pin projecting from the lock piece (11). Between a pin (16) projecting substantially centrally of the lock piece (11) and a pin (17) projecting from the free end of the hooker link (14) is extended a spring (18). To the other end of the lock shaft (9) is secured a lock lever (19).

Also, lock pins (20) (20') adapted to be engaged within the engagement recesses (10) of the lock pieces (11) (11') are mounted opposingly above the lock pieces (11) (11') by means of arms (21) (21') to both sides of the movable frame (6), and thus the lock pins (20) (20') cooperate with the lock pieces (11) (11') to form the lock mechanism L.

Figure 3:
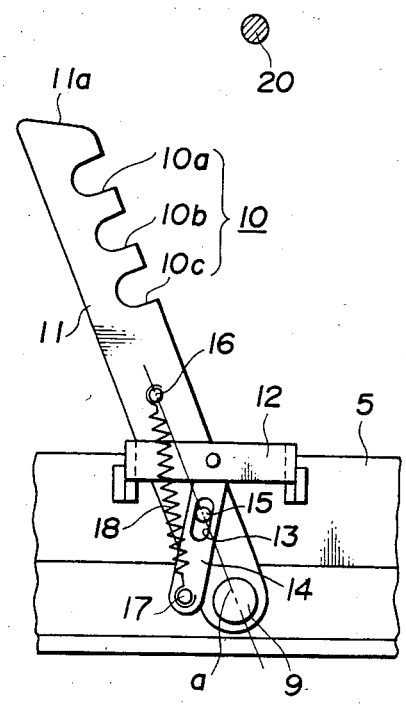
FIG. 3 illustrates a lock mechanism of a seat suspension according to the invention, with A showing its unlocked condition and B showing its locked position.
Figure 3:
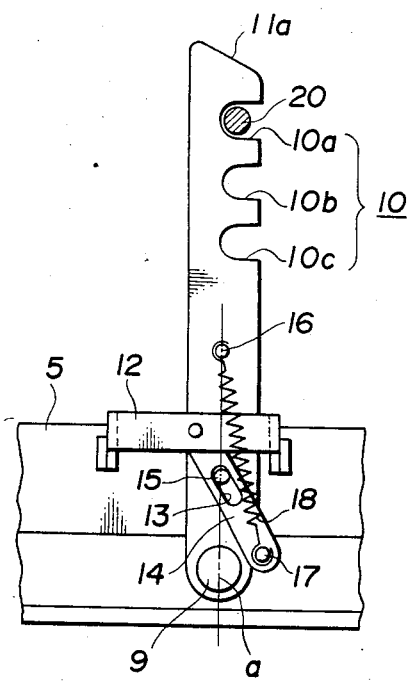

The operation of the thus arranged seat suspension (4) will now be described. First, in normal operation, a lock lever (19) is pushed down and the lock shaft (9) is rotated to incline the lock pieces (11) (11') forwardly (FIG. 3A.). In this state, the hooker link (14) has been rotated forwardly aobut its pivotally connected portion to the bracket (12) by means of engagement of its slot (13) with the lock pieces (11), the pin (17) provided at the free end of the hooker link (14) is positioned forwardly of a center line which connects an axial center of the pin (16) of the lock piece (11) with that of the lock shaft (9). The tension of the spring (18) extended between pin (17) and the pin (16) pulls the hooker link (14) forwardly and thus maintains it in its forwardly rotated position so that the lock piece (11) is maintained in its forwardly inclined position. At the same time, the other lock piece (11') is also held in its forwardly inclined position by means of the lock shaft (9).

The forward inclination of these lock pieces (11) (11') permits them to be disengaged from the lock pins (20) (20') on the movable frame (6) side, so that the vertical level of the movable frame (6) can be freely adjusted relative to the base frame (5) and also a cushioning operation in a vertical direction can be performed.

Next, when stopping the suspension function of the seat suspension (4) while it is in operation, the lock lever (19) is lifted so as to rotate the lock pieces (11) (11') by means of the lock shaft (9). This rotation causes the slot (13) and the guide pin (15) to be engaged with each other so as to rotate the hooker link (14) rearwardly. During this rotation of the hooker link (14), the spring (18) between the pins (16) and (17) is stretched to the maximum when the free end of the link (14) is positioned on the center line a of the lock piece (11), or, the spring reaches its dead point. If the spring is stretched beyond this dead point, the contracting elasticity of the spring (18) suddenly rotates the hooker link (14) rearwardly to help the lock pieces (11) (11') to stand up and rotate, so that the lock pieces are brought into and maintained in their standing-up positions, respectively.

In this condition, if the movable frame (6) is pressed down from the seat cushion (2) side, then the lock pins (20) (20') are abutted against the tip ends of the lock pieces (11) (11') and fall down while pushing and rotating these lock pieces (11) (11') against the elasticity of the spring (18) along the respective inclined upper edges (11a) (11a'), so that the lock pins are engaged within the engagement recess (10), that is, within the uppermost engagement recess (10a). This engagment of the lock pins (20) (20') with the lock pieces (11) (11') causes the movable frame (6) to be immovable respective to the base frame (5), so that the suspension function is caused to stop (FIG. 3B). Also, with the lock pieces (11) (11') rotated forwardly somewhat forcibly by the lock lever (19), the movable frame (6) is lowered further to cause the lock pins (20) (20') to be opposed to the lower engagement recess (10b) or (10c) of the lock pieces (11) (11') and then the lock pieces (11) (11') are raised up and rotated again, so that the lock pins (20) (20') are engaged within the engagement recess (10b) or (10c). As a result, the movable frame (6) is engaged and maintained in the lower position.

Thus, according to the disclosed embodiment of the present invention, the movable frame (6) and thus the seat cushion (2) can be engaged and held such that their respective height levels are shiftable in a plurality of steps. Accordingly, the seat suspension (4) can be used as a seat lifter which adjusts the height of the seat cushion (2).

As described before, if the lock lever (19) is pressed down in the above engaged condition to rotate the lock pieces (11) (11') forwardly, then the engagement of the engagement recess (10) with the lock pins (20) (20') is released, so that the movable frame (6) becomes free to rise and fall relative to the base frame (5) and thus the suspension function resumes its operation.

Although in this embodiment the lock mechanism L is installed in the front portion of the seat suspension (4), this installation location is not limitative, but the lock mechanism L may be mounted in the most suitable location for operation according to the position of the seat (1). Also, the positions of the lock pieces (11) (11') and lock pins (20) (20') may be reversed. Further, the reslient means for the seat suspension (4) is not limited to the spring but may be a pneumatic or hydraulic means.

As described hereinbefore, according to the invention, the lock mechanism L adapted to lock the movable frame to the base frame is provided in the seat suspension so that the movable frame can be locked in a desired height level. With the arrangement of the invention, when the movable frame is not locked, a normal suspension operation is performed. When the movable frame is locked, this suspension operation is caused to stop so that undesirable rolling can be prevented to occur in bad road conditions and thus the possibility of ill effects on the comfortable driving can also be eliminated. Further, with the movble frame locked, the distance between the seat cushion of the seat and the driving wheel can be maintained constant whether the seat is occupied or not and thus it is quite smooth to climb in and out of a car which is provided with the seat suspension of the invention. Moreover, according to the invention, even while the suspension function is stopped, it is possible to select a desired seat height which suits the preference or physique, especially sitting height of occupants, and thus the occupants are able to select an easy and comfortable sitting attitude.

What is claimed is:

1. A seat suspension including a base frame adapted to being fixed to a vehicle floor, a movable frame, mounting means for mounting said movable frame for vertical movement between raised and lowered positions, relative to said base frame, and lock means operatively disposed between said base frame and said movable frame for locking said base frame to said movable frame to thus prevent vertical movement thereof, wherein said lock means includes:

a lock piece provided in one frame of said movable and base frames;

a lock pin provided in the other frame of said movable and base frames;

means defining at least one lock recess in said lock piece to establish said lowered position of said movable frame and engageable with said lock pin to lock said movable frame to said base frame at said lowered position;

coupling means for coupling said lock piece to said one frame for pivotal movements between (a) a disengaged position wherein said lock recess and lock pin are disengaged from one another to permit said vertical movement of said movable frame and (b) an engaged position wherein said lock recess and said lock pin are engageable with one another to prevent said vertical movement of said movable frame;

manually-operated handle means connected to said lock piece for permitting manual movement of said lock piece between said engaged and disengaged positions;

said coupling means including biasing means for biasing said lock piece in a first rotational direction to releasably maintain said lock piece in said disengaged position and a second rotational direction, opposite to said first rotational direction, to assist in pivotal movement of said lock piece from said disengaged position and into said engaged position; wherein an upper end of said lock piece includes means defining an inclined surface slidably engageable with said lock pin when said lock piece is in said engaged position, said inclined surface-defining means for pivoting said lock piece from said engaged position, in said first rotational direction towards said disengaged position, in response to said lock pin being slidably engaged therewith when said movable frame is downwardly vertically moved from said raised position and towards said lowered position, said biasing means thereafter causing said lock piece to be pivotally moved, in said second pivotal direction, back into said engaged position when said lock pin and said lock recess are in registry with one another thereby causing said lock pin and said lock recess to be engaged with one another.

2. The seat suspension as recited in claim 1 further comprising a bracket secured to said one frame for enclosing said lock piece, a hooker link pivotally connected to said bracket and having an elongated slot, a guide pin mounted to and extending from said lock piece and being slidably engaged within said slot, and wherein said biasing means includes a spring extended between a free end of said hooker link and a central portion of said lock piece.

3. The seat suspension as recited in claim 1 wherein said mounting means mounts said base and movable frames to one another in a pantographic way by means of two links being pivotally and crosswise mounted thereto, and wherein a spring is extended between said two links to constantly bias said two links in a direction tending to move said movable frame to said raised position.

* * * * *